United States Patent [19]

Waynant

[11] 3,864,643
[45] Feb. 4, 1975

[54] TRAVELING WAVE VACUUM SPARK AND A TRAVELLING WAVE FLASHLAMP

[75] Inventor: Ronald W. Waynant, Laurel, Md.

[73] Assignee: The United States of America as represented by the Secretary of the Navy, Washington, D.C.

[22] Filed: Nov. 23, 1973

[21] Appl. No.: 418,345

[52] U.S. Cl....... 331/94.5 PE, 331/94.5 G, 330/4.3, 333/21, 333/31, 343/781, 313/227, 313/220
[51] Int. Cl.......... H01s 3/09, H01s 3/02, H01s 3/22
[58] Field of Search....... 331/94.5; 330/4.3; 333/21, 333/31; 343/781, 783, 785; 313/220, 227

[56] References Cited
OTHER PUBLICATIONS

Waynant et al., Proceedings of the IEEE, vol. 59, no. 4, April, 1971, pp. 679-684 TK 5700 17.

Beaulieu, Proceedings of the IEEE, vol. 59, no. 4, April, 1971, pp. 667-674 TK 5700 17.

Primary Examiner—Robert J. Webster
Attorney, Agent, or Firm—R. S. Sciascia; Arthur L. Branning; M. L. Crane

[57] ABSTRACT

A traveling wave vacuum spark laser comprising an elongated container containing a gas therein in combination with elongated electrodes or a plurality of tiny pin-like electrodes which are vaporized and ionized upon discharge of a current across the container. Current is discharged progressively along the length of the container by a traveling wave such that the ionized gases are propelled along the length of the chamber. The traveling wave results in a laser light output without the use of an optical cavity which has different uses.

6 Claims, 6 Drawing Figures

TRAVELING WAVE VACUUM SPARK AND A TRAVELLING WAVE FLASHLAMP

BACKGROUND OF THE INVENTION

The present invention relates to gas lasers and more particularly to a traveling wave transverse discharge system in which stimulated emission is produced.

Heretofore, a traveling wave discharge system has been set forth in an article by John D. Shipman, Jr. in *Applied Physics Letters*, 10, Vol. 1, January 1967, pp. 3-4. The teaching of this traveling wave system has been used by others to produce a traveling wave excited gas laser. Such a system has been set forth in U.S. Pat. No. 3,729,689 as well as in several published articles. Such as, "A Fast-Rise-Time Excitation System for Production of Vacuum Ultraviolet Laser Emission" by R. W. Waynant and J. D. Shipman, Jr., *IEEE J. Quantum Electronics*, Vol. QE7, No. 6, June 1971, page 282; and "Vacuum Ultraviolet Laser Emission from C IV", by Ronald W. Waynant, *Applied Physics Letters*, Vol. 22, No. 8, April 15, 1973, pages 419-420. Additional, published articles are listed as references in the latter article. The above references set forth the development of the traveling wave vacuum laser.

SUMMARY OF THE INVENTION

This invention is an improvement over the prior art traveling wave vacuum laser systems. The improvement includes small pin-like electrodes in the electrode chamber which are vaporized and ionized and excited in a traveling wave manner. This system has utility as a fast flashlamp for IR, visible, UV, vacuum UV, and possibly an X-ray laser.

This system includes traveling wave transverse discharge system capable of exciting a long thin column of gas or vapor from a solid in an extremely fast manner. Current is passed into the gas contained between the electrodes in a transverse manner, and the time sequence of transverse current flow produces a longitudinal velocity variable from the electromagnetic wave velocity in the dielectric ($<c$) to infinite. The device operates with either a plurality of tiny pin electrodes or with two continuous electrodes of any desired length. The device operates as a vacuum arc laser at low pressures ($10^{-5}$ – $10^{-3}$ Torr) where it is capable of producing directional X-rays from the vaporization of its own electrodes and also operates at pressures of several Torr where it produces lasing by electron impact with gases. In addition, the device may be used as a flashlamp both for production of X-ray lasers by photoionization in a traveling wave manner and for the pumping of dye lasers in the UV and visible by using xenon or other gas to photo excite. It may be used in the infrared with $CO_2$ or other gases also a gas container placed directly over the discharge can be photo-excited with the aid of seed gases. Used in conjunction with a second set of electrodes within the gas to maintain the proper E/p for the discharge, a traveling wave pulsed IR laser can be produced. By use of the traveling wave excitation, the gas is not pumped until the "split nano second" before the amplifying pulse reaches it thereby preventing pre-oscillation. In this device no resonant cavity with mirrors is required so that mirror damage problems are eliminated.

DESCRIPTION OF THE DEVICE

Figure 1:
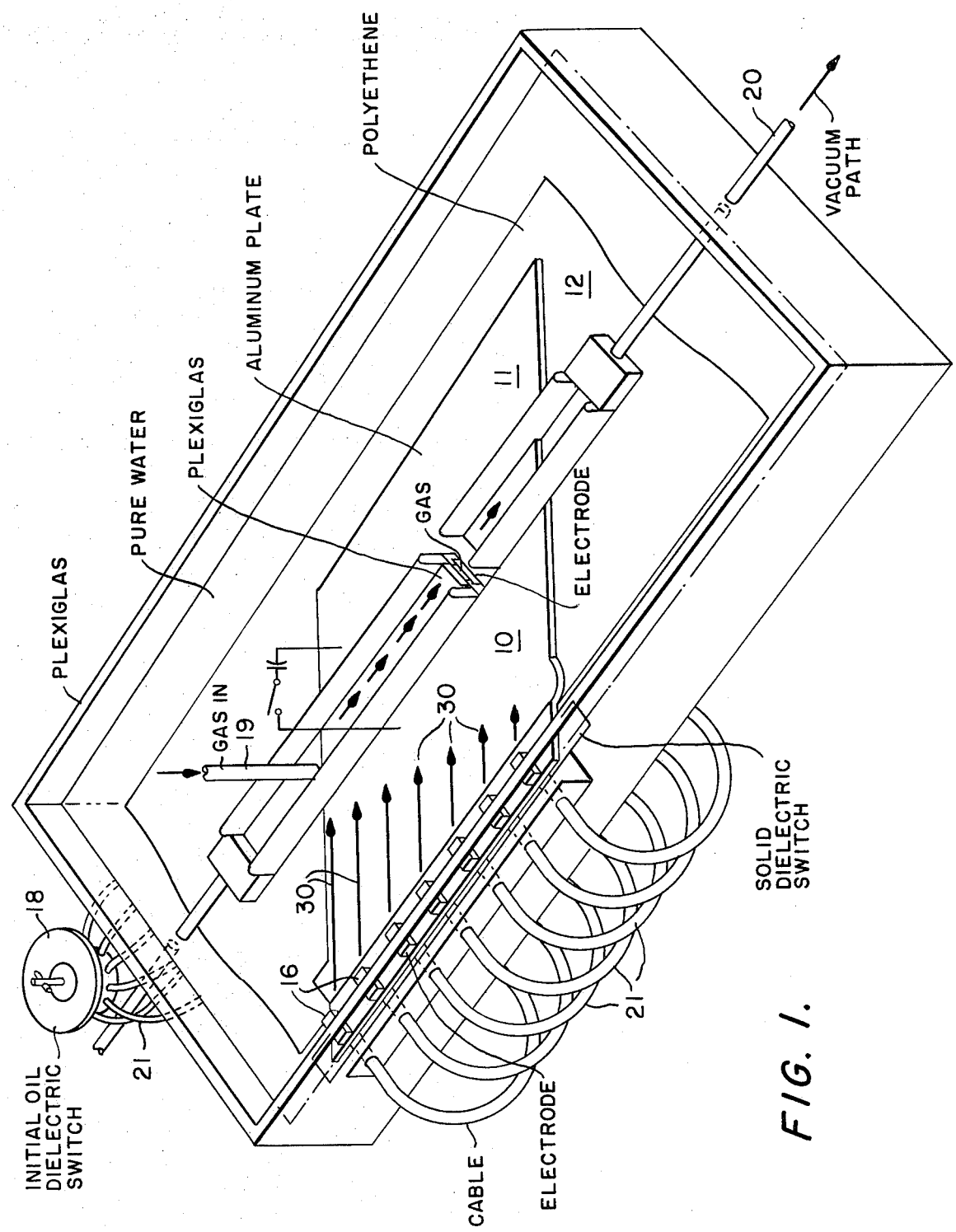
FIG. 1 illustrates a perspective view of a system including the present device.
Figure 2:
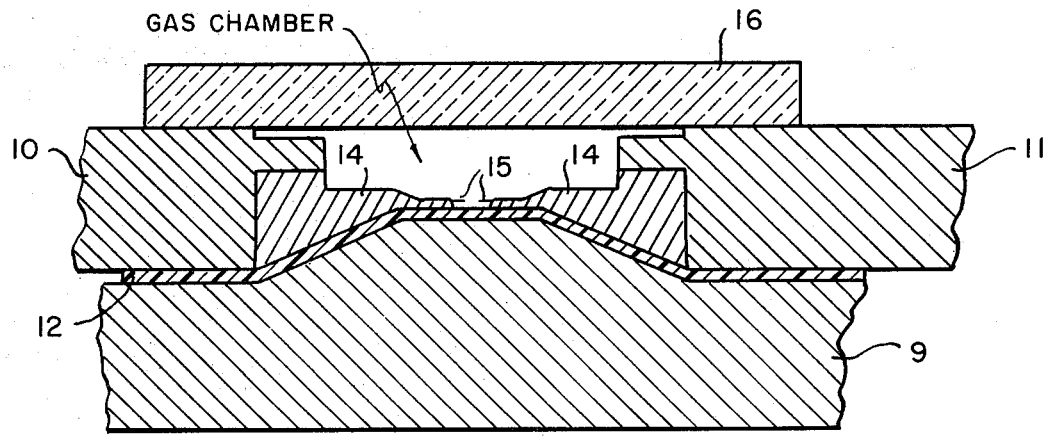
FIG. 2 illustrates a partial cross sectional view illustrating the relative parts of the laser system.

Now referring to the drawings, FIGS. 1 and 2, there is shown by illustration a system including the improvement set forth by this invention. The gaseous laser system is formed by low inductance flat bottom plate 9 and upper electrically conductive plates 10 and 11 made of aluminum and separated by an insulator material such as a polyethlene sheet 12. The top plate has a small spacing or gap in it across the entire length thereof with the opposite ends at the gap equipped with opposing parallel elongated electrodes 14. Each of the electrodes 14 are provided with small pin-like type electrodes 15 having a length of about 1mm and spaced about one-eighth inch apart along the entire length of the elongated electrodes secured to the upper plate along the gap therein. A top plate 16 is secured over the opening or spacing within the upper plate along the entire length thereof to enclose the area between the electrodes within the gap in the upper plate to form a chamber. If the device is operated within an evacuated area, there is no need for end windows at the end of the chamber. However if the system is not in an evacuated system end windows should be used. Such windows may be made of lithium fluoride. A gas or liquid may be added to the area confined between the electrodes for excitation to produce stimulated emission. Suitable gases have been found to be $N_2, H_2, D_2, Ar_2, CO, Xe_2, Ne_2, CsAr, LiXe$, as well as dye solutions. A tube 19 is provided for evacuating and or admitting a suitable gas into the gas chamber. Thus, the gas becomes the load between the electrodes.

Low jitter solid dielectric switches 17 are equally spaced across one edge of the flat plates such that the switches cause an electrical short between the two flat plates when the switches are electrically fired. The switches are fired sequentially by use of an initiating solid dielectric switch in an oil capacitor 18. The proper sequence of firing the switches is determined by cutting the connecting cables 21 a different length so that the iniating current is delayed in accordance with the resistance and length of the conductive cable. The device may be operated within an evacuated area, in a room at room temperature and/or within a tank filled with pure deionized water to prevent surface voltage tracking and corona.

As an example of making the device, the flat electrically conductive plates are rectangular having a size of about 1.6 meter × 1 meter × 1.2 cm with a 1.5 mm thickness sheet of polyethylene separating the plates which is greater in length and width than the flat plates.

In operation, the bottom plate of the sandwich is grounded and both sections of the upper plate are resonantly charged to from 80–200 kV. The area between the opening in the top electrode is evacuated to about $10^{-5}$ Torr and then filled with a desired gas at a pressure of about 20–50 m Torr. The dielectric switch is closed which sequentially closes the shorting switches starting with the first switch closest to the dielectric switch. Upon closing of the first switch, the two flat plates are electrically shorted together. This produces a reversed voltage wave which travels in both directions toward the electrodes 14, 15. The intersection of this voltage wave with the electrodes produces a potential across the electrodes which is twice that of the charging voltage characteristic of the well known Blumlein Circuit. The potential across the electrodes vaporizes and ionizes the small pin-like electrodes along with the gas within the chamber. Since the shorting switches are fired sequentially with slight delay, the reversed voltage produced by each shorting switch arrives at the electrodes at different times as represented by arrows 30, FIG. 1, thereby producing an electromagnetic wave which is at an angle with the axis of the electrodes as represented by the line 22 in FIG. 3. In this way, the pin-type electrodes are sequentially vaporized and ionized along with excitation of the gas from one end to the other. As the gas is excited along the length of the channel between the electrodes, the gases are driven along the length thereof at a speed just below the speed of light. In this manner, the gas molecules aided by vaporization and ionization of the pin-like electrodes are inverted and simultaneously the inversion is swept out by the stimulated emission wave. Therefore light is driven along the channel and emerges from the end of the channel.

Excitation of the gas and vaporization and ionization of the pin-like electrode materials produces a plasma which may be used for production of vacuum, UV, UV, visible, infrared and possible X-ray lasers.

Figure 3:
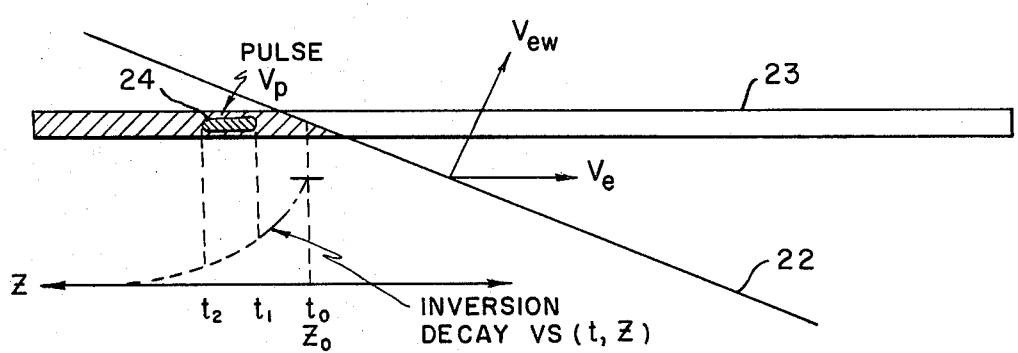
FIG. 3 illustrates an inversion decay $V_s(t,z)$ curve relative to the pulse velocity $V_p$, the electromagnetic wave velocity $V_{ew}$, and the electron velocity $V_e$.

FIG. 3 illustrates an inversion decay $V_s(t,z)$ curve relative to the pulse velocity, $V_p$, the electromagnetic wave velocity, $V_{ew}$, and the excitation velocity, $V_e$. As shown, the electromagnetic line 22 is shown at an angle relative to the plate 23 along which the pulse 24 travels. Since the amplified pulse travels with group velocity, which is less than the speed of light and since gain has a short lifetime, the excitation velocity, $V_e$, must be adjusted to match the pulse velocity, $V_p$. This adjustment has been set forth in the prior literature in an article "Laser Emission in the Vacuum Ultraviolet from Molecular Hydrogen," by Waynant et al., *Proceedings of the IEEE*, Vol. 59, No. 4, April 1971, pp. 679–684 (p. 682). As shown by the sketch, FIG. 3, the pulse velocity should travel in the area shown between $t_o$ and $t$, for best results.

The system described may be evacuated and operated without a gas in the channel between the electrodes wherein the pin-like electrodes will be vaporized and ionized and excited in a traveling wave manner as described above. In this manner highly ionized anode material will be formed directly between the electrodes 14 thereby forming an ion laser.

Figure 4:
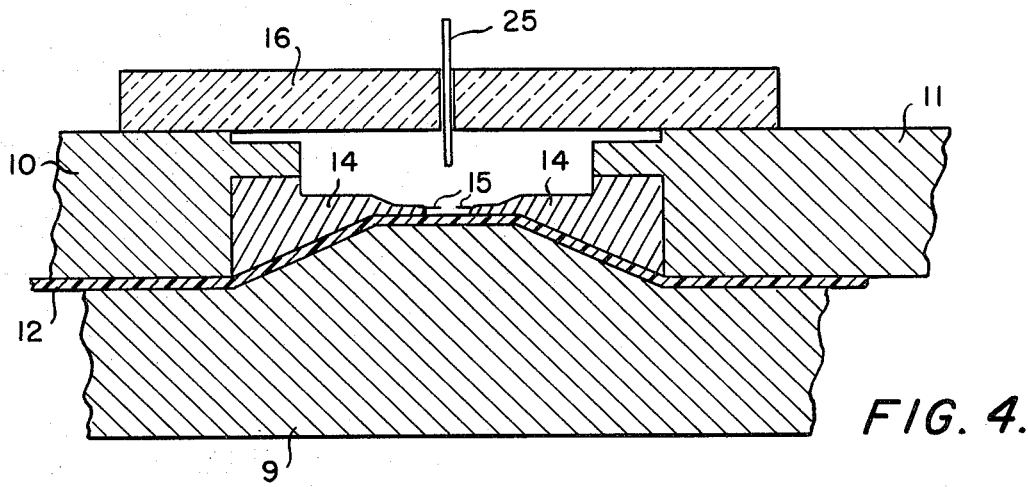
FIG. 4 illustrates a modification of the device shown in FIG. 2 which includes additional electrodes in the gas chamber.

FIG. 4 illustrates a modification which includes a plurality of electrodes 25 aligned along the length of the chamber and extending into the chamber through the upper plate. These electrodes may be used to preionize a gas within the chamber prior to discharging the main load across the plate electrodes which ionize the pin-like electrodes. Such a system improves the operation in production of the laser light.

Figure 5:
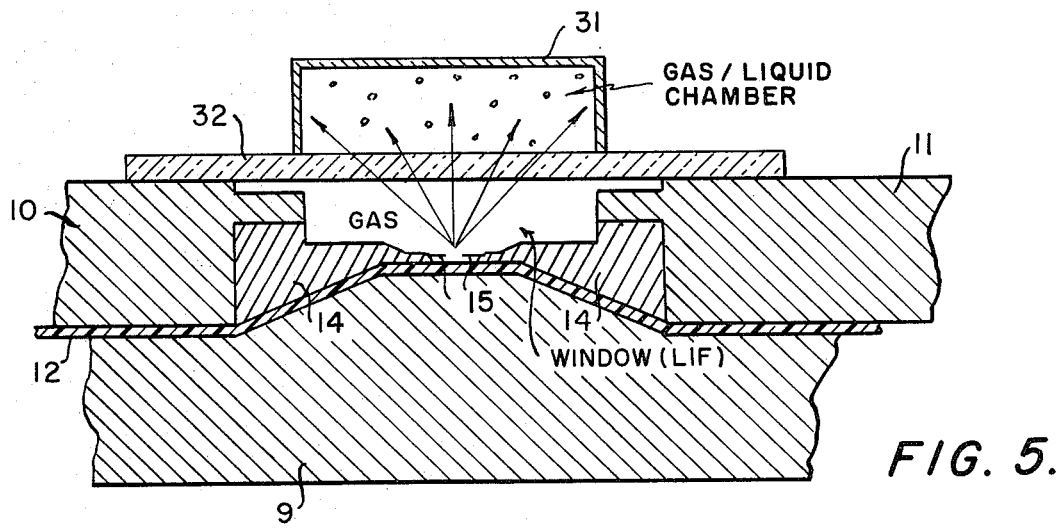
FIG. 5 illustrates another modification which has a separate gas chamber above the electrode gas chamber shown in FIGS. 1 and 2.

The device explained above, modified as shown in FIG. 5, may be used for exciting a gas, or a liquid dye within a pressurized chamber 31 immediately above the chamber plate or window 32 which serves as the bottom of the upper chamber. The gas or dye is admitted to the upper chamber and is excited by the laser light produced between the electrodes 14 which light flashes through the lithium fluoride window 32 serving as the upper enclosure of the chamber between the electrodes. In the above described system using a voltage of 200kV and a current of 400kA, peak power is $8 \times 10^{10}$ watts and the peak intensity is reached in 2–3 nano seconds which is sufficient for flashlamp excitation of gases and liquids.

Figure 6:
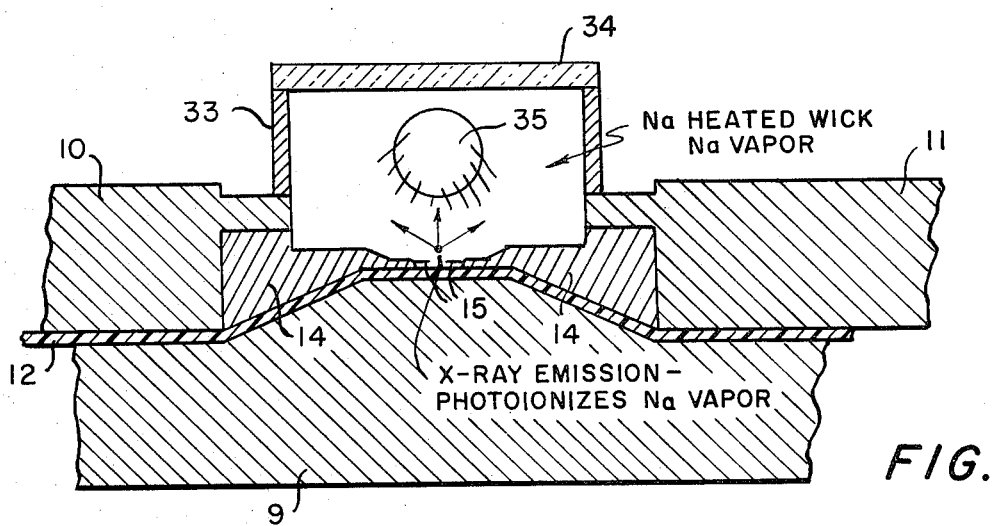
FIG. 6 is a further modification which includes a sodium heated wick that produces sodium vapors in the gas chamber.

FIG. 6 is a modification of the chamber as shown in FIG. 2 which includes therein a sodium wick 35 which is heated to give off sodium vapors in an evacuated chamber 33 including window 34 prior to the discharge across the pin-like electrodes. In this modification, the pin electrodes are ionized during the discharge across the plate electrodes, as described above, producing X-ray emission. The X-ray emission in combination with the sodium vapor photoionizes the sodium vapor to produce a photoionization laser in the far vacuum ultraviolet near 372A.

The laser systems set forth above operate without any mirrors such as used in the usual laser cavity. Therefore high powers can be obtained since there are no mirror design restrictions.

The following list includes the type of wavelengths that can be produced by the system of FIG. 1 or modifications thereof. The list includes corresponding uses, process of use and the lasing materials for producing the listed wavelengths.

Uses of the Device

| Wavelength | How used | Process | Lasing materials |
| --- | --- | --- | --- |
| X-Ray | Vacuum Arc | Electrode vaporization and pinching long line of sparks | Cu,Al,Zn,etc |
| | X-ray pump (flashlamp) | Use of x-ray emission from sparks to pump by photoexcitation and photoionization | Na,etc |
| VUV | Discharge | Electron impact | $H_2, D_2, CO$, rare gas molecules, ions, eg CIV |
| | Flashlamp | Photoexcitation | Dyes |
| UV | Discharge | Electron impact | $N_2$ |
| | Flashlamp | Photoexcitation | Dyes |
| | Discharge | Electron impact | Ne, other gases, ions |
| Visible | Flashlamp | Photoexcitation | Dyes, solids, gases |
| IR | Flashlamp | Preionization used in the 2nd discharge | |

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. An improved traveling wave fast rise time excitation system for production of laser emission comprising first and second flat plate transmission lines separated by an insulating sheet of polyethylene, said first transmission line separated across the middle to form spaced plate sections, an elongated electrode secured to each spaced plate section in the space formed between said plate sections facing each other in parallel alignment with a spacing between said electrodes, a chamber formed by an upper window enclosing said spacing between said spaced plate sections, means for adding a gas within said chamber, a plurality of equally spaced shorting switches secured to one edge of said flat plate transmission lines, and a switch means and conductors secured to said shorting electrodes to sequentially fire each of said switches, in order, to produce an electromagnetic wave at an angle with respect to said electrodes on said spaced plate, the improvement comprising;

a plurality of equally spaced small pin-like electrodes secured to each of said elongated electrodes in spaced relationship along the entire length thereof and insulated from said plate transmission line; and means for exciting a gas within said chamber and simultaneously vaporizing and ionizing said pin-like electrodes progressively along the length of said plate electrode from one end to the other end to produce a plasma within said chamber.

2. An improved laser emission system as claimed in claim 1, in which
said upper window enclosing the spacing between said spaced plate sections to form said chamber is lithium fluoride.

3. An improved laser emission system as claimed in claim 2 which includes
auxiliary electrodes extending into said chamber through said lithium fluoride window,
said auxiliary electrodes extending into said chamber along the entire length of said chamber.

4. An improved laser emission system as claimed in claim 2; which includes,
a sodium wick within said chamber extending the length of said chamber.

5. An improved laser emission system as claimed in claim 2; which includes,
a high pressure chamber above said lithium fluoride window extending the length of said chamber.

6. An improved laser emission system as claimed in claim 1; in which,
each of said plurality of equally spaced small pin-like electrodes secured to said elongated electrodes have a length of about 1 mm and are spaced about one-eighth inch apart along the length of the elongated electrodes.

* * * * *